(12) United States Patent
Lyu et al.

(10) Patent No.: US 11,172,393 B2
(45) Date of Patent: Nov. 9, 2021

(54) CHANNEL STATE INDICATION METHOD AND APPARATUS, AND NETWORK DEVICE

(71) Applicant: Huawei Technologies Co., Ltd., Shenzhen (CN)

(72) Inventors: Yongxia Lyu, Ottawa (CA); Ronghui Wen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/664,137

(22) Filed: Oct. 25, 2019

(65) Prior Publication Data

US 2020/0059812 A1 Feb. 20, 2020

Related U.S. Application Data

(63) Continuation of application No. PCT/CN2018/084468, filed on Apr. 25, 2018.

(30) Foreign Application Priority Data

Apr. 28, 2017 (CN) .................. 201710300252.X

(51) Int. Cl.
*H04L 5/00* (2006.01)
*H04B 17/309* (2015.01)
*H04W 24/10* (2009.01)

(52) U.S. Cl.
CPC .......... *H04W 24/10* (2013.01); *H04L 5/0057* (2013.01); *H04B 17/309* (2015.01)

(58) Field of Classification Search
CPC ....... H04L 5/0053; H04L 5/00; H04L 5/0055; H04L 1/0026; H04L 1/0003; H04L 1/0009; H04L 1/1861; H04L 5/0057; H04L 1/18; H04L 1/1819; H04L 1/0073; H04L 1/08; H04L 1/1822; H04L 1/1896; H04L 1/203; H04L 5/006; H04L 1/0025; H04L 1/16; H04L 1/1635; H04L 1/1858; H04L 1/1864; H04L 2001/125; H04L 2209/80; H04L 27/0012; H04L 1/1829; H04L 1/00; H04B 7/0626; H04B 7/0632; H04B 17/309; H04B 17/318; H04B 7/0417; H04B 7/0486;
(Continued)

(56) References Cited

U.S. PATENT DOCUMENTS

2002/0110088 A1 8/2002 Lundby et al.
2007/0253473 A1* 11/2007 Ishii .................. H04W 72/02
375/224
(Continued)

FOREIGN PATENT DOCUMENTS

CN 102884743 A 1/2013
CN 105187153 A 12/2015
(Continued)

*Primary Examiner* — Daniel Lai
(74) *Attorney, Agent, or Firm* — Slater Matsil, LLP

(57) ABSTRACT

A method includes: obtaining, by a first network device, channel state information; generating, by the first network device, channel state indication information, where the channel state indication information includes an absolute value of the channel state information or an offset value of the channel state information relative to reference channel state information; and sending, by the first network device, the channel state indication information to a second network device.

13 Claims, 5 Drawing Sheets

(58) Field of Classification Search
CPC .... H04B 17/24; H04B 17/327; H04B 17/336; H04B 17/345; H04B 17/391; H04B 7/0636; H04B 7/0645; H04B 7/0658; H04B 7/066; H04W 24/10; H04W 74/006; H04W 76/28; H04W 24/04; H04W 52/0206; H04W 52/0274; H04W 52/04; H04W 52/06; H04W 52/16; H04W 52/243; H04W 52/38; H04W 52/383; H04W 52/50; H04W 52/58

See application file for complete search history.

(56) References Cited

U.S. PATENT DOCUMENTS

| | | | |
|---|---|---|---|
| 2009/0041150 A1* | 2/2009 | Tsai | H04B 7/0617 375/267 |
| 2009/0116570 A1 | 5/2009 | Bala et al. | |
| 2009/0213955 A1* | 8/2009 | Higuchi | H04L 1/0643 375/267 |
| 2010/0166111 A1* | 7/2010 | Park | H04L 1/1819 375/298 |
| 2011/0249584 A1* | 10/2011 | Barbieri | H04L 5/0091 370/252 |
| 2012/0002556 A1 | 1/2012 | Kishiyama et al. | |
| 2012/0113861 A1* | 5/2012 | Chun | H04L 1/0026 370/252 |
| 2012/0134275 A1* | 5/2012 | Choi | H04L 1/0026 370/241 |
| 2012/0218953 A1* | 8/2012 | Zirwas | H04L 1/0028 370/329 |
| 2012/0314611 A1 | 12/2012 | Baker et al. | |
| 2013/0021925 A1* | 1/2013 | Yin | H04B 7/024 370/252 |
| 2015/0319626 A1* | 11/2015 | Yi | H04W 72/1226 370/329 |
| 2016/0066282 A1* | 3/2016 | Ouchi | H04L 5/00 455/522 |
| 2017/0155491 A1 | 6/2017 | Dai et al. | |
| 2017/0367092 A1 | 12/2017 | Kim et al. | |
| 2018/0019855 A1* | 1/2018 | Zhang | H04L 1/0026 |

FOREIGN PATENT DOCUMENTS

| | | |
|---|---|---|
| CN | 106160932 A | 11/2016 |
| CN | 106559165 A | 4/2017 |
| WO | 2016105126 A1 | 6/2016 |

* cited by examiner

CHANNEL STATE INDICATION METHOD AND APPARATUS, AND NETWORK DEVICE

CROSS-REFERENCE TO RELATED APPLICATIONS

This application is continuation application of International Application No. PCT/CN2018/084468, filed on Apr. 25, 2018, which claims priority to Chinese Patent Application 201710300252.X, filed on Apr. 28, 2017. The disclosures of the aforementioned applications are hereby incorporated by reference in their entireties.

TECHNICAL FIELD

This application relates to the field of communications technologies, and in particular, to a channel state indication method and apparatus, and a network device.

BACKGROUND

With continuous development of communications technologies, requirements for a service are increasingly high, for example, requirements of high reliability and a low latency. Therefore, various technologies emerge. For example, compared with a fourth generation mobile communications technology (4G) system, a major feature of a fifth generation mobile communications technology (5G) system is to support an ultra-reliable and low-latency service (URLLC). The URLLC technology may be applied to various fields, such as industrial control, industrial manufacture process automation, man-machine interaction, and telemedicine, to improve reliability of service transmission and reduce a communication latency. In addition, to further improve reliability of service transmission, a retransmission mechanism is generally used to transmit same data for a plurality of times. Currently, a same modulation and coding scheme (MCS) is used when data is repeatedly transmitted for a plurality of times, and a channel state changes with time. Therefore, if the same MCS is used for transmission repeatedly performed for a plurality of times, a problem that channel quality changes with time cannot be resolved, and in this case, a reliability improvement effect of repeated transmission is reduced. In other words, reliability of data transmission is reduced.

SUMMARY

Embodiments of the present invention provide a channel state indication method and apparatus, and a network device, to help improve reliability of data transmission.

According to a first aspect, an embodiment of the present invention provides a channel state indication method, including: obtaining, by a first network device, channel state information; generating, by the first network device, channel state indication information used to indicate the channel state information; and sending, by the first network device, the channel state indication information to a second network device; and receiving, by the second network device, the channel state indication information that is sent by the first network device and that is used to indicate the channel state information; and obtaining, by the second network device, the channel state information.

Optionally, the first network device may be a terminal, or may be a base station; and correspondingly, the second network device may be a base station, or may be a terminal.

The channel state indication information may include an absolute value of the channel state information or an offset value of the channel state information relative to reference channel state information. Therefore, according to a preset rule, the first network device can determine to send the absolute value or the offset value to the second network device, so that the second network device can transmit data based on the absolute value or the offset value, thereby improving flexibility of a channel state indication. In this way, signaling overheads can be reduced while it is ensured that a channel state is correctly fed back, and reliability of data transmission is improved.

In some possible designs, the second network device may further send physical layer signaling to the first network device. The first network device may further receive the physical layer signaling sent by the second network device. The physical layer signaling may include a first state and/or a second state. Therefore, the first network device can determine, based on the physical layer signaling, whether to send the absolute value or the offset value to the second network device. Optionally, the physical layer signaling may be carried in scheduling information. For example, the physical layer signaling may be carried in a downlink DL grant or an uplink UL grant.

In some possible designs, if the physical layer signaling is the first state, the channel state indication information may include the offset value of the channel state information relative to the reference channel state information; and/or if the physical layer signaling is the second state, the channel state indication information may include the absolute value of the channel state information.

In some possible designs, the physical layer signaling may further carry feedback time information, so that the first network device can send the channel state indication information at a time indicated by the feedback time information. Optionally, if the time indicated by the feedback time information is different from a reporting time of the channel state indication information, the first network device may determine, according to a dynamic indication of the second network device, whether to perform feedback at the time indicated by the feedback time information or the reporting time, or the first network device performs feedback based on the time indicated by the feedback time information or the reporting time by default. For example, the first network device performs feedback based on the reporting time by default. This is not limited in this embodiment of the present invention. The reporting time may be obtained through preconfiguration, or may be notified by the second network device to the first network device by using signaling.

In some possible designs, the physical layer signaling may be indicated by using an indication field in downlink control information (Downlink control information, DCI for short), so that the first network device can obtain the physical layer signaling by receiving the DCI, and further determine a state of the physical layer signaling. To be specific, the physical layer signaling may be indicated by multiplexing the indication field in the DCI.

In some possible designs, if a time from last sending of the channel state indication information exceeds a preset time threshold, the channel state indication information includes the absolute value of the channel state information; or if a time from last sending of the channel state indication information does not exceed the preset time threshold, the channel state indication information includes the offset value of the channel state information relative to the reference channel state information. The time compared with the preset time threshold may be a time difference (time interval) between a current time at which the channel state indication information is transmitted and a time (moment) at which the channel state indication information is sent last time, for example, a time difference between a current time (moment) and a time at which the channel state indication information is sent last time, or a time difference between a current time at which the channel state indication information is sent and a time at which the channel state indication information is sent last time, or a time difference between a current time at which the channel state information is obtained and a time at which the channel state indication information is sent last time, or the like. Therefore, the first network device can determine, based on whether the time difference between the current time and the time at which the channel state indication information is sent last time or the time difference between the current sending time and the time at which the channel state indication information is sent last time or the time difference between the current time at which the channel state information is obtained and the time at which the channel state indication information is sent last time exceeds the preset time threshold, whether the absolute value or the offset value is to be sent to the second network device.

In some possible designs, a length of the preset time threshold may be notified by the second network device to the first network device, or the length of the preset time threshold may be preconfigured.

In some possible designs, if the channel state information corresponds to initial transmission of a transport block, namely, first transmission, the channel state indication information may include the absolute value of the channel state information; or if the channel state information corresponds to repeated transmission of the transport block, that is, transmission other than the first transmission, the channel state indication information may include the offset value of the channel state information relative to the reference channel state information.

In some possible designs, the channel transmitted for a plurality of times may occupy a same frequency domain resource, or may occupy different frequency domain resources. When a frequency domain resource of a channel transmitted at a specific time is different from a frequency domain resource of a channel transmitted at a previous time, even if the channel state information corresponds to repeated transmission of the transport block, the first network device may still report the absolute value of the channel state information, to improve reliability of the obtained channel state information.

In some possible designs, the reference channel state information may be channel state information sent by the first network device last time; or the reference channel state information may be preconfigured; or the reference channel state information may be notified by the second network device to the first network device.

In some possible designs, the channel state information may include at least one of channel quality indicator (CQI) information, modulation and coding scheme (MCS) information, power information, and block error rate (BLER) information. Further, optionally, a type of channel state information fed back by the terminal may be predefined; or the type may be notified by the base station to the terminal by using signaling.

In some possible designs, the MCS may be used to indicate a modulation and coding scheme, or may be used to indicate a quantity of transmission times of a transport block, or may be used to indicate a combination of the modulation and coding scheme and the quantity of transmission times. Further optionally, a correspondence between the MCS level and the modulation and coding scheme, and/or a correspondence between the MCS level and the quantity of transmission times, and/or a correspondence between the MCS level and the combination of the modulation and coding scheme and the quantity of transmission times may be obtained through preconfiguration. For example, the correspondence may be agreed in a protocol, or may be notified by the second network device to the first network device.

In some possible designs, if the channel state indication information includes the offset value of the channel state information relative to the reference channel state information, the channel state indication information and an acknowledgment message may be jointly coded. In other words, the first network device may send a feedback message that includes the channel state indication information and the currently transmitted acknowledgment message. Optionally, when the acknowledgement message is a positive acknowledgement message, the first network device may no longer send the channel state indication information.

In some possible designs, the first network device may report the channel state information based on a transmission state of the transport block and the physical layer signaling sent by the second network device. For example, if the first network device receives, before transmitting a transport block for a first time, the physical layer signaling used to indicate reporting of the channel state information, the first network device may generate, based on the physical layer signaling, the channel state indication information including the absolute value of the channel state information or the offset value of the channel state information relative to the reference channel state information. Specifically, if the physical layer signaling is the first state, even for initial transmission, the first network device may generate the channel state indication information including the offset value of the channel state information relative to the reference channel state information. If the physical layer signaling is the second state, the first network device may generate the channel state indication information including the absolute value, and send the channel state indication information, to implement reporting. Further, for subsequent repeated transmission of the transport block, the first network device may still generate the channel state indication information including the offset value and send (report) the channel state indication information.

In some possible designs, the first network device may report the channel state information based on a transmission state of the transport block and information indicating whether a time from last sending of the channel state indication information exceeds the preset time threshold. For example, if the obtained channel state information is corresponding to the initial transmission of the transport block, the first network device may further determine whether a time from last sending of the channel state indication information exceeds the preset time threshold, and if the time does not exceed the preset time threshold, even for the initial transmission, the first network device may still report the offset value of the channel state information relative to the reference channel state information. In other words, the first network device may generate the channel state indication information including the offset value. If time exceeds the preset time threshold, the first network device may report the absolute value of the channel state information. In other words, the first network device may generate the channel state indication information including the absolute value. Further, for subsequent repeated transmission of the transport block, the first network device may still report the offset value.

According to a second aspect, this application further provides a channel state indication apparatus, where the apparatus may be disposed in a network device, and the apparatus includes: a processing unit and a transceiver unit, where the apparatus may implement, by using the foregoing units, some or all of the steps performed by the first network device in the channel state indication method according to the first aspect.

According to a third aspect, this application further provides a channel state indication apparatus, where the apparatus may be disposed in a network device, and the apparatus includes: a transceiver unit and a processing unit, where the apparatus may implement, by using the foregoing units, some or all of the steps performed by the second network device in the channel state indication method according to the first aspect.

According to a fourth aspect, this application further provides a computer storage medium, where the computer storage medium stores a program, and when the program is executed, some or all of steps performed by the first network device in the channel state indication method according to the first aspect are performed.

According to a fifth aspect, this application further provides a computer storage medium, where the computer storage medium stores a program, and when the program is executed, some or all of steps performed by the second network device in the channel state indication method according to the first aspect are performed.

According to a sixth aspect, this application further provides a network device, including: a transceiver and a processor, where the processor is connected to the transceiver; and the processor is configured to perform some or all of the steps performed by the first network device in the channel state indication method according to the first aspect.

According to a seventh aspect, this application further provides a network device, including: a transceiver and a processor, where the processor is connected to the transceiver; and the processor is configured to perform some or all of the steps performed by the second network device in the channel state indication method according to the first aspect.

According to an eighth aspect, this application further provides a channel state indication system, including: a first network device and a second network device, where the first network device is configured to perform some or all of steps performed by the first network device in the channel state indication method according to the first aspect; and the second network device is configured to perform some or all of steps performed by the second network device in the channel state indication method according to the first aspect.

In this application, the first network device may obtain the channel state information, generate, according to a preset rule, the channel state indication information including the absolute value of the channel state information or the offset value of the channel state information relative to the reference channel state information, and send the channel state indication information to the second network device to indicate a current channel state of a channel, so that the second network device can transmit data based on the channel state information that meets the current channel state, to help improve reliability of data transmission.

BRIEF DESCRIPTION OF THE DRAWINGS

To describe the technical solutions in the embodiments of the present invention or in the background more clearly, the following briefly describes the accompanying drawings required for describing the embodiments of the present invention or the background.

DETAILED DESCRIPTION OF ILLUSTRATIVE EMBODIMENTS

Figure 1:
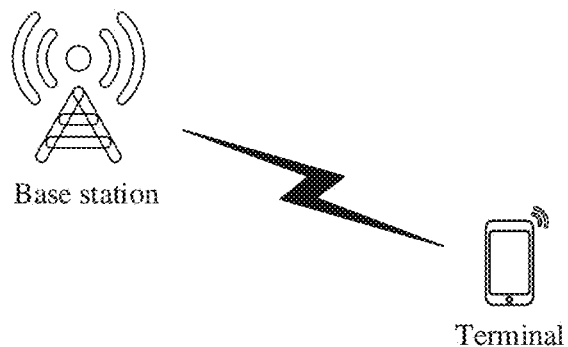
FIG. 1 is an architectural diagram of a communications system according to an embodiment of the present invention.

The following describes the embodiments of the present invention with reference to the accompanying drawings in the embodiments of the present invention.

Optionally, the technical solutions of this application may be specifically applied to various communications systems, for example: a global system for mobile communications (GSM), a code division multiple access (CDMA) system, a wideband code division multiple access (WCDMA) system, a time division-synchronous code division multiple access (TD-SCDMA) system, a universal mobile telecommunications system (UMTS), a long term evolution (LTE) system, and the like. With continuous development of communications technologies, the technical solutions in this application may be further applied to a future network, for example, a fifth generation mobile communications technology (5G) system, which may be also referred to as an NR (NR) system, a D2D (device to device) system, an M2M (machine to machine) system, or the like.

In this application, the embodiments of the present invention are described with reference to a network device. The network device, for example, a first network device or a second network device, may be a base station, or may be a terminal. For example, communication in the embodiments of the present invention may be communication between a base station and a terminal, or may be communication between base stations, for example, communication between a macro base station and a small cell, or may be communication between terminals, for example, communication in a D2D network.

In this application, a terminal may access a base station based on a synchronization signal, a broadcast signal, a control signal, or the like of the base station, receive a message of the base station, and exchange data with the base station. Optionally, the terminal may be a wireless terminal or a wired terminal. The wireless terminal may be a device that provides a user with voice and/or data connectivity, a handheld device with a wireless connection function, or another processing device connected to a wireless modem, and may communicate with one or more core networks by using a radio access network (RAN). For example, the terminal may be a mobile terminal, for example, a mobile phone (or referred to as a "cellular" phone) and a computer having a mobile terminal, or may be a portable, pocket-sized, handheld, computer-embedded, or vehicle-mounted mobile apparatus, for example, a personal communications service (PCS) telephone, a cordless telephone, a session initiation protocol (SIP) telephone set, a wireless local loop (WLL) station, a personal digital assistant (PDA), and the like, and the terminal exchanges voice and/or data with a radio access network. Optionally, the terminal may be also referred to as user equipment (UE), a mobile station (MS), a mobile terminal, a subscriber unit (SU), or a subscriber station (SS), a mobile station (MS), a remote station (RS), an access point (AP), a remote terminal (RT), an access terminal (AT), a user terminal (UT), a user agent (UA), a terminal device (UD), or the like. This is not limited in this application.

In this application, a base station may be a device that communicates with the terminal over an air interface in an access network by using one or more sectors, and may coordinate attribute management of the air interface. For example, the base station may be configured to send a synchronization signal, a broadcast signal, or a control signal to the terminal, schedule each terminal to send or receive information, and exchange data with the terminal. For example, the radio access network device may be a base station in the GSM or the CDMA system, for example, a base transceiver station (BTS), or may be a base station in the WCDMA system, for example, a NodeB, or may be an evolved NodeB in the LTE system, for example, an eNB or an eNodeB (evolutional Node B), or may be a base station in the 5G system, for example, a gNB, or a base station in the future network. This is not limited in this application. Optionally, the base station may be a relay device, or another network element device having a base station function.

In this application, a time cell is a unit corresponding to a type of time unit. The time unit is a time unit, a scheduling unit, or a transmission unit that is in time domain and that is used for information transmission. The time unit includes an integer quantity of symbols in time domain. For example, the time unit may refer to a subframe, or may refer to a slot (slot), or may refer to a radio frame or a mini-slot (mini slot or sub slot), a plurality of aggregated slots, a plurality of aggregated subframes, a symbol, or the like, or may refer to a transmission time interval (TTI). This is not limited in this application. One or more time cells of a type of time unit may include an integer quantity of time cells of another type of time unit in time domain, or a length of one or more time cells of a type of time unit is equal to a sum of lengths of an integer quantity of time cells of another type of time unit in time domain. For example, a mini-slot/slot/subframe/radio frame includes an integer quantity of symbols, a slot/subframe/radio frame includes an integer quantity of mini-slots, a subframe/radio frame includes an integer quantity of slots, a radio frame includes an integer quantity of subframes, and the like, and there may be also another example of an including relationship. This is not limited in this application.

In this application, a channel may be also referred to as a signal or may have another name. This is not limited in this application. A main function of the channel is a function such as data transmission, channel estimation or measurement, or synchronization between a base station and a terminal, between base stations, or between terminals at a physical layer. A pilot may be also referred to as a reference signal or may have another name. This is not limited in this application. A main function of the pilot is performing channel estimation, measurement, or the like for a base station or a terminal.

In this application, signaling may be higher layer signaling, for example, a broadcast message, a system message, radio resource control (RRC) signaling, media access control (MAC) signaling, or the like; or the signaling may be physical layer signaling or the like. For example, the message may be downlink control information (DCI) signaling at a physical layer, or the like. This is not limited in this application.

The following describes an application scenario of this application. In this application, an example in which a first network device is a terminal and a second network device is a base station is used for description, namely, an example of communication between the base station and the terminal. FIG. 1 is an architectural diagram of a communications system according to an embodiment of the present invention. Specifically, as shown in FIG. 1, the communications system includes a base station and a terminal. The base station and the terminal may communicate with each other by using various communications systems, for example, the 5G system in the foregoing wireless communications system, also referred to as an NR system, for another example, an LTE system, to implement information transmission.

When the base station and the terminal transmit information, the terminal may indicate, to the base station according to a specific rule, an absolute value of channel state information or an offset value of the channel state information relative to reference channel state information, so that the base station can perform a subsequent data transmission operation based on relatively accurate channel state information, thereby improving reliability of data transmission.

This application discloses a channel state indication method, apparatus, and system, and a network device, to help improve reliability of data transmission. The following separately provides detailed descriptions.

Figure 2:
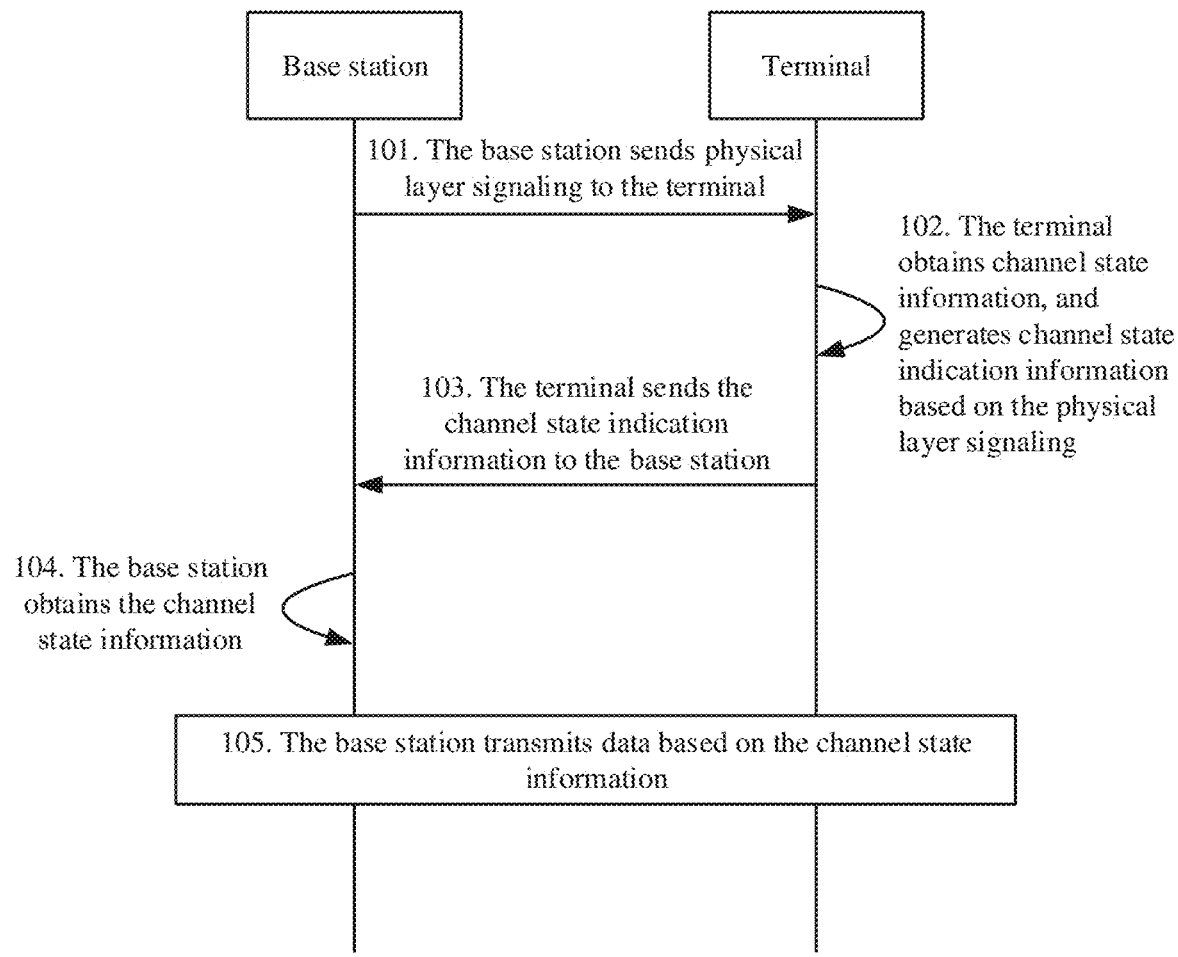
FIG. 2 is a schematic interaction diagram of a channel state indication method according to an embodiment of the present invention.

Referring to FIG. 1 and FIG. 2, FIG. 2 is a schematic interaction diagram of a channel state indication method according to an embodiment of the present invention. Specifically, in this embodiment of the present invention, an example in which a first network device is a terminal and a second network device is a base station is used for description. As shown in FIG. 2, the channel state indication method in this embodiment of the present invention may include the following steps.

101. The base station sends physical layer signaling to the terminal.

Optionally, when the base station needs to obtain a channel state of a channel between the base station and the terminal, the base station may send the physical layer signaling to the terminal. For example, in a process of retransmitting a transport block for a plurality of times, if the base station needs to obtain a current channel state, the base station may send a piece of physical layer signaling to the terminal, to instruct the terminal to obtain current channel state information. The physical layer signaling may include one or more states. For example, the states may be classified into a first state and a second state. Further, optionally, the physical layer signaling may be carried in scheduling information. For example, the physical layer signaling may be carried in a downlink DL grant or an uplink UL grant.

Optionally, the channel state information may include at least one of types of information such as CQI information, MCS information, power information, and BLER information.

102. The terminal obtains channel state information, and generates channel state indication information based on the physical layer signaling.

Specifically, the terminal may receive the physical layer signaling sent by the base station. The physical layer signaling may include one or more states. Further, after receiving the physical layer signaling, the terminal may obtain the current channel state information, and generate, based on the physical layer signaling, the channel state indication information used to indicate the channel state information, and the channel state indication information may include an absolute value of the channel state information or an offset value of the channel state information relative to reference channel state information. In other words, the terminal may determine, based on the physical layer signaling, whether to feed back the absolute value or the offset value to the base station. Optionally, the physical layer signaling may be a type of signaling such as a CQI trigger indication, an MCS trigger indication, a power trigger indication, or a BLER trigger indication. This is not limited in this embodiment of the present invention. Optionally, the physical layer signaling may be indicated by using an indication field in DCI, so that the terminal can obtain the physical layer signaling by receiving the DCI, and further determine a state of the physical layer signaling. In other words, the physical layer signaling may be indicated by multiplexing the indication field in the DCI.

Optionally, the physical layer signaling may include the first state and/or the second state. If the physical layer signaling is the first state, the channel state indication information may include the offset value of the obtained channel state information relative to the reference channel state information; and/or if the physical layer signaling is the second state, the channel state indication information may include the absolute value of the obtained channel state information. For example, the base station may indicate the state of the physical layer signaling by using one bit, for example, if a value of the bit is 0, it indicates that the physical layer signaling is the first state; or if the value of the bit is 1, it indicates that the physical layer signaling is the second state. Alternatively, optionally, the physical layer signaling may also include only one state. To be specific, when receiving the physical layer signaling, the terminal may determine to report the absolute value fixedly. In other words, the channel state indication information may include the absolute value of the obtained channel state information. Alternatively, the physical layer signaling may be another state, for example, the state of the physical layer signaling is indicated by using a plurality of bits. This is not limited in this embodiment of the present invention.

The reference channel state information may be channel state information sent by the terminal last time, and may be specifically a value (an absolute value or an offset value) of the channel state information sent last time, or an absolute value of channel state information sent latest time. Alternatively, the reference channel state information may be preconfigured. For example, the reference channel state information may be a preconfigured fixed value. The fixed value may match a type of channel state information, for example, both are CQIs, or both are MCSs, or both are power information, or both are BLERs, or a set that includes a plurality of types of a plurality of fixed values may be preconfigured, so that the terminal can determine, based on the type of channel state information, reference channel state information matching the type. Alternatively, the reference channel state information may be notified by the base station to the terminal. For example, the reference channel state information may be dynamically or semi-statically notified to the terminal by using signaling.

103. The terminal sends the channel state indication information to the base station.

104. The base station obtains the channel state information.

Specifically, after generating the channel state indication information, that is, after determining the absolute value or the offset value of the channel state information that needs to be fed back, the terminal may send the channel state indication information to the base station, to notify the base station of the current channel state of the channel between the base station and the terminal. The base station receives the channel state indication information that is sent by the terminal and that is used to indicate the channel state information, and may obtain the channel state information from the channel state indication information. The base station obtains the absolute value of the channel state information or the offset value of the channel state information relative to the reference channel state information.

105. The base station transmits data based on the channel state information.

Optionally, the technical solution in this embodiment of the present invention may be applied to a retransmission technology, and the retransmission technology includes transmission of a transport block that is performed by a base station for a plurality of times. Specifically, the base station may send the transport block to the terminal, and the terminal feeds back an acknowledgement message based on a receiving result. The acknowledgement message may include a positive acknowledgement message or a negative acknowledgement message. For example, when determining that the terminal correctly receives the transport block, the terminal returns a positive acknowledgement message such as an ACK (Acknowledgement) message, or when the terminal fails to receive the transport block, the terminal returns a negative acknowledgment message such as a NACK (Not Acknowledgement) message or a DTX (Discontinuous Transmission) message. If the base station receives the NACK or the DTX, the base station performs repeated transmission until the terminal correctly receives the transport block or a quantity of transmission times reaches a set maximum quantity of retransmission times.

Optionally, the base station may send, to the terminal, a piece of configuration information that is used to indicate L transmission times and channel state information feedback (reporting), for example, L repetition configuration information. The configuration information may be used to indicate that the base station transmits a same transport block for a maximum of L times, and may be further used to indicate that the terminal needs to feed back channel state information, such as CQI information, MCS information, power information, or BLER information. Alternatively, the base station may further separately send, to the terminal, configuration information used to indicate L transmission times and configuration information used to indicate channel state information feedback. L is a positive integer, and a typical value of L may be 2, 3, or 5. The transmission performed L times may be suspended based on ACK feedback of the terminal, and/or may be suspended when the quantity of transmission times reach L times. If the terminal receives, in a time unit such as a slot n, data during first transmission (also referred to as "initial transmission" or "start transmission"), the terminal may measure channel state information of the slot n, and feed back, in a slot n+k, channel state indication information used to indicate the channel state information. Further, optionally, when the channel state information of the slot n is measured, the channel state information may be obtained through measurement based on a demodulation pilot used during current transmission, or may be obtained through measurement based on a measurement pilot of a current slot, namely, a slot n. Herein, k is an integer greater than or equal to 0, k may be used to indicate a time interval between a sending time of the channel state indication information and a time of receiving the transport block, and k may be preconfigured. For example, k may be agreed in a protocol. Alternatively, k may be notified by the base station to the terminal by using signaling. For example, a value of k may be 2. This is not limited in this embodiment of the present invention. Therefore, the terminal can determine the sending time, namely, the reporting time, based on the time interval.

Optionally, when the terminal determines that the terminal needs to feed back the NACK or the DTX, and receives the physical layer signaling, execution of step 102 to step 104 may be triggered, for example, steps of obtaining the channel state information of the slot n and sending (for example, sending in a slot n+k), to the base station, the channel state indication information used to indicate the channel state information. Further, optionally, if the channel state indication information includes the offset value of the channel state information relative to the reference channel state information, the channel state indication information and the acknowledgment message may be jointly coded. For example, a joint message used to indicate the channel state indication information and the acknowledgment message is fed back at a reporting time such as the slot n+k, or the joint message is fed back at an acknowledgment time corresponding to the acknowledgment message. The reporting time and the acknowledgment time may be the same or different. Further, optionally, when the acknowledgement message is a positive acknowledgement message, the terminal may no longer send the channel state indication information.

Further, optionally, the base station may send one piece of physical layer signaling in each transmission process in the retransmission technology, or the base station may send the physical layer signaling during initial transmission, or the base station may send the physical layer signaling at any of a plurality of transmission times based on an actual requirement. This is not limited in this embodiment of the present invention. Further, optionally, if the terminal does not receive the physical layer signaling sent by the base station, the terminal may report the offset value by default. To be specific, the terminal may obtain the current channel state information, generate the channel state indication information including the offset value of the channel state information relative to the reference channel state information, and send the channel state indication information to the base station, to reduce signaling overheads.

Further, optionally, the type of channel state information fed back by the terminal may be predefined. For example, that the CQI is to be fed back is agreed in a protocol; or the feedback type may be notified by the base station to the terminal by using signaling. This is not limited in this embodiment of the present invention.

For example, if the type of channel state information that needs to be fed back is CQI, when the terminal determines to report the offset value, the terminal may send, to the base station, an offset value of the CQI corresponding to the current channel relative to a reference CQI. The reference CQI may be a CQI reported last time, or may be a fixed value, for example, 2. For example, if the CQI reported last time meets CQI=2, the CQI corresponding to the current channel meets CQI=3, and the offset value reported by the terminal meets Delta CQI=3−2=1. Optionally, the offset value may be indicated by one or more bits. For example, when a quantity of bits used to indicate the offset value is 1, 0 may be used to mean no change, and 1 means degrading by one CQI level, a meaning of 0/1 may be agreed in a protocol or configured by the base station and notified to the terminal by using signaling. For another example, for an edge user, because a channel state relatively greatly fluctuates, 0/1 may respectively mean degrading by one or three CQI levels. For a center user, because a channel state is relatively stable, 0/1 may respectively mean no change or degrading by one CQI level, and so on. Details are not enumerated herein. Further, optionally, if the offset value of the CQI corresponding to the current channel relative to the reference CQI is different from an adjustment value of 0/1, the terminal may report an offset value that is closest to a current offset value and that indicates a greater downward offset extent. For example, if the CQI reported last time meets CQI=2, the CQI corresponding to the current channel meets CQI=3, and the offset value meets Delta CQI=3−2=1, namely, upgrading by one CQI level. However, if 0/1 respectively means no change and degrading by one CQI level, the terminal may report 0, namely, no change. If the CQI needs to be fed back, when the terminal determines to report an absolute value, the terminal may send the CQI corresponding to the current channel to the base station. For example, when the CQI corresponding to the current channel meets CQI=3, the terminal may report 3.

For another example, if the MCS needs to be fed back, when the terminal determines to report the offset value, the terminal may send, to the base station, an offset value of an MCS corresponding to the current channel relative to a reference MCS. The reference MCS may be an MCS reported last time, or an MCS used for current data transmission. It is assumed that the reference MCS meets MCS=2, and the MCS corresponding to the current channel meets MCS=1. The offset value reported by the terminal meets Delta MCS=1−2=−1. Optionally, the offset value may be indicated by one or more bits. For an indication manner of the offset value, refer to related descriptions of bit indication for feeding back the CQI. Details are not described herein again. If the MCS needs to be fed back, when the terminal determines to report the absolute value, the terminal may send the MCS corresponding to the current channel to the base station. For example, when the MCS corresponding to the current channel meets MCS=1, the terminal may report 1; or the terminal may send the CQI corresponding to the current channel to the base station. For example, when the CQI corresponding to the current channel meets CQI=3, the terminal may report 3. Optionally, the MCS level may be used to indicate a modulation and coding scheme, or may be used to indicate a quantity of transmission times of a transport block, or may be used to indicate a combination of the modulation and coding scheme and the quantity of transmission times. Further optionally, a correspondence between the MCS level and the modulation and coding scheme, and/or a correspondence between the MCS level and the quantity of transmission times, and/or a correspondence between the MCS level and the combination of the modulation and coding scheme and the quantity of transmission times may be agreed in a protocol or indicated by the base station to the terminal. This is not limited in this embodiment of the present invention.

For another example, if the power information needs to be fed back, when the terminal determines to report the offset value, the terminal may send, to the base station, an offset value of a signal to interference plus noise ratio (English: Signal to Interference plus Noise Ratio, SINR for short) of the current channel relative to an SINR corresponding to a target BLER. It is assumed that the SINR of the current channel meets SINR=2 dB and the SINR corresponding to the target BLER meets SINR=3 dB. The offset value reported by the terminal meets Delta Power=2−3=−1. Optionally, the offset value may be indicated by one or more bits. For an indication manner of the offset value, refer to related descriptions of bit indication for feeding back the CQI. Details are not described herein again. If the power information needs to be fed back, when the terminal determines to report the absolute value, the terminal may send a useful signal received power corresponding to the current channel to the base station, for example, when the useful signal received power corresponding to the current channel is equal to 1 dBm, the terminal may report 1. Optionally, the target BLER may be preconfigured. For example, the target BLER may be agreed in a protocol, or may be notified by the base station to the terminal by using signaling.

For still another example, if the BLER needs to be fed back, when the terminal determines to report the offset value, the terminal may send, to the base station, an offset value of the BLER corresponding to the current channel relative to a reference BLER. The reference BLER may be a BLER reported last time, or a target BLER used for current data transmission. For example, if the target BLER of the current data transmission meets BLER=0.01, and the BLER corresponding to the current channel meets BLER=0.02, the offset value reported by the terminal meets Delta BLER=0.02−0.01=0.01. Optionally, the offset value may be indicated by one or more bits. For example, when a quantity of bits used to indicate the offset value is 1, 0 may be used to indicate that the BLER corresponding to the current channel is not greater than the target BLER, and 1 may be used to indicate that the BLER corresponding to the current channel is greater than the target BLER. The meaning of 0/1 may be agreed in a protocol or configured by the base station and notified to the terminal by using signaling. For another example, the quantity of bits used to indicate the offset value is 2. For an edge user, because a channel state relatively greatly fluctuates and transmission reliability of the edge user is to be ensured, 00/01/10/11 may be used to respectively indicate that the BLER corresponding to the current channel is not greater than the target BLER. 0.05 is greater than the BLER corresponding to the current channel minus the target BLER, and the BLER corresponding to the current channel minus the target BLER is greater than 0; 0.1 is greater than the BLER corresponding to the current channel minus the target BLER, and the BLER corresponding to the current channel minus the target BLER is greater than 0.05; and the BLER corresponding to the current channel minus the target BLER is greater than 0.1. For a center user, because the channel state is relatively stable, 00/01/10/11 may be used to respectively indicate that the BLER corresponding to the current channel is not greater than the target BLER. 0.02 is greater than the BLER corresponding to the current channel minus the target BLER, and the BLER corresponding to the current channel minus the target BLER is greater than 0, 0.05 is greater than the BLER corresponding to the current channel minus the target BLER, and the BLER corresponding to the current channel minus the target BLER is greater than 0.02; and the BLER corresponding to the current channel minus the target BLER is greater than 0.05. Optionally, the target BLER may be preconfigured. For example, the target BLER may be agreed in a protocol, or may be notified by the base station to the terminal by using signaling. The BLER corresponding to the current channel may be determined based on an MCS level used for the current data transmission and an SINR of the current channel that is estimated based on a pilot. Further optionally, the CQI corresponding to the current channel or the MCS corresponding to the current channel may be determined based on the SINR of the current channel and the target BLER. If the BLER needs to be fed back, when the terminal determines to report the absolute value, the terminal may send the BLER corresponding to the current channel to the base station. For example, when the BLER corresponding to the current channel meets BLER=0.02, the terminal may report 0.02; or the terminal may send the CQI corresponding to the current channel to the base station. For example, when the CQI corresponding to the current channel meets CQI=3, the terminal may report 3. Further optionally, when reporting the absolute value or the offset value, the terminal may further report the type of channel state information. To be specific, the terminal adds the type of channel state information to the channel state indication information.

Further, optionally, the reported type may be also associated with a state of the physical layer signaling, so that the base station can indicate, by using the state, the type of channel state information sent by the terminal. In other words, the type may be directly notified by the base station to the terminal by using the physical layer signaling. For example, both the first state and the second state of the physical layer signaling are associated with the CQI trigger indication. When the physical layer signaling is the first state, the physical layer signaling is the CQI trigger indication, and indicates reporting of the offset value, the terminal may obtain the current CQI, and reports an offset value of the CQI (for example, an offset value of the current CQI relative to a CQI reported last time) to the base station. When the physical layer signaling is the second state, the type of physical layer signaling is the CQI trigger indication, and the CQI trigger indication indicates reporting of an absolute value, the terminal may obtain an absolute value of the current CQI, and report the absolute value of the CQI to the base station. Optionally, the state of the physical layer signaling may be further associated with the MCS trigger indication, the power information, the BLER trigger indication, or the like, and the terminal can select, for reporting, an absolute value or an offset value based on the state of the physical layer signaling. This is not enumerated herein.

Further, optionally, the physical layer signaling may further carry feedback time information, so that the terminal may send the channel state indication information at a time indicated by the feedback time information. Optionally, if the time indicated by the feedback time information is different from the reporting time of the channel state indication information, the terminal may determine, according to a dynamic indication of the base station, that the feedback is to be performed at the time indicated by the feedback time information or the reporting time, or the terminal performs feedback based on the time indicated by the feedback time information or the reporting time by default. For example, the terminal performs feedback based on the reporting time. This is not limited in this embodiment of the present invention.

Further, optionally, after obtaining the channel state indication information reported by the terminal, the base station may determine whether the channel state information indicated by the channel state indication information is an absolute value or an offset value, a manner in which the base station determines whether the channel state information indicated by the channel state indication information is an absolute value or an offset value may be corresponding to a manner in which the terminal determines whether the absolute value or the offset value is to be reported (or a manner in which the terminal determines whether an absolute value or an offset value is included in the channel state indication information), and the absolute value and the offset value may be obtained through preconfiguration, or may be notified by the terminal to the base station. For example, after delivering the physical layer signaling, the base station may determine, based on the state of the physical layer signaling, whether the terminal reports the absolute value or the offset value. For example, when the physical layer signaling is the first state, the base station determines that the terminal reports the offset value; or when the physical layer signaling is the second state, the base station determines that the terminal reports the absolute value. Details are not described herein again. Further, the base station may obtain the channel state indicated by the channel state indication information, and transmit data based on the channel state information. For example, if the terminal reports an absolute value of the CQI, the base station may determine an MCS and/or transmit power and/or a quantity of repetition times for data transmission based on the reported absolute value of the CQI, to transmit data based on the MCS and/or the transmit power and/or the quantity of repetition times. For another example, if the terminal reports an offset value of the CQI, the base station may determine the absolute value of the CQI based on the absolute value of the CQI and a reference CQI, for example, a CQI reported last time or a preset fixed CQI value, and determine, based on the absolute value of the CQI, an MCS and/or transmit power and/or a quantity of repetition times for data transmission, to transmit data.

In this embodiment of the present invention, the terminal may obtain the channel state information, generate, based on the physical layer signaling sent by the base station, the channel state indication information including the absolute value of the channel state information or the offset value of the channel state information relative to the reference channel state information, and send the channel state indication information to the base station, so that the base station can transmit data based on the channel state information that meets the current channel state, to help improve reliability of data transmission. In addition, compared with reporting of the absolute value, reporting of the offset value can help save signaling. However, a reporting interval of the offset value is limited, and cannot cover all channel states, and an indication of the offset value is inaccurate. In addition, in this embodiment of the present invention, the offset value or the absolute value can be adaptively selected for reporting based on an actual scenario, and compared with a manner of reporting only the absolute value, signaling overheads are reduced. Compared with a manner of reporting only the offset value, reliability of an obtained channel state is improved, and reliability of data transmission is further improved. To be specific, signaling overheads can be reduced while it is ensured that a channel state is correctly fed back.

Figure 3:
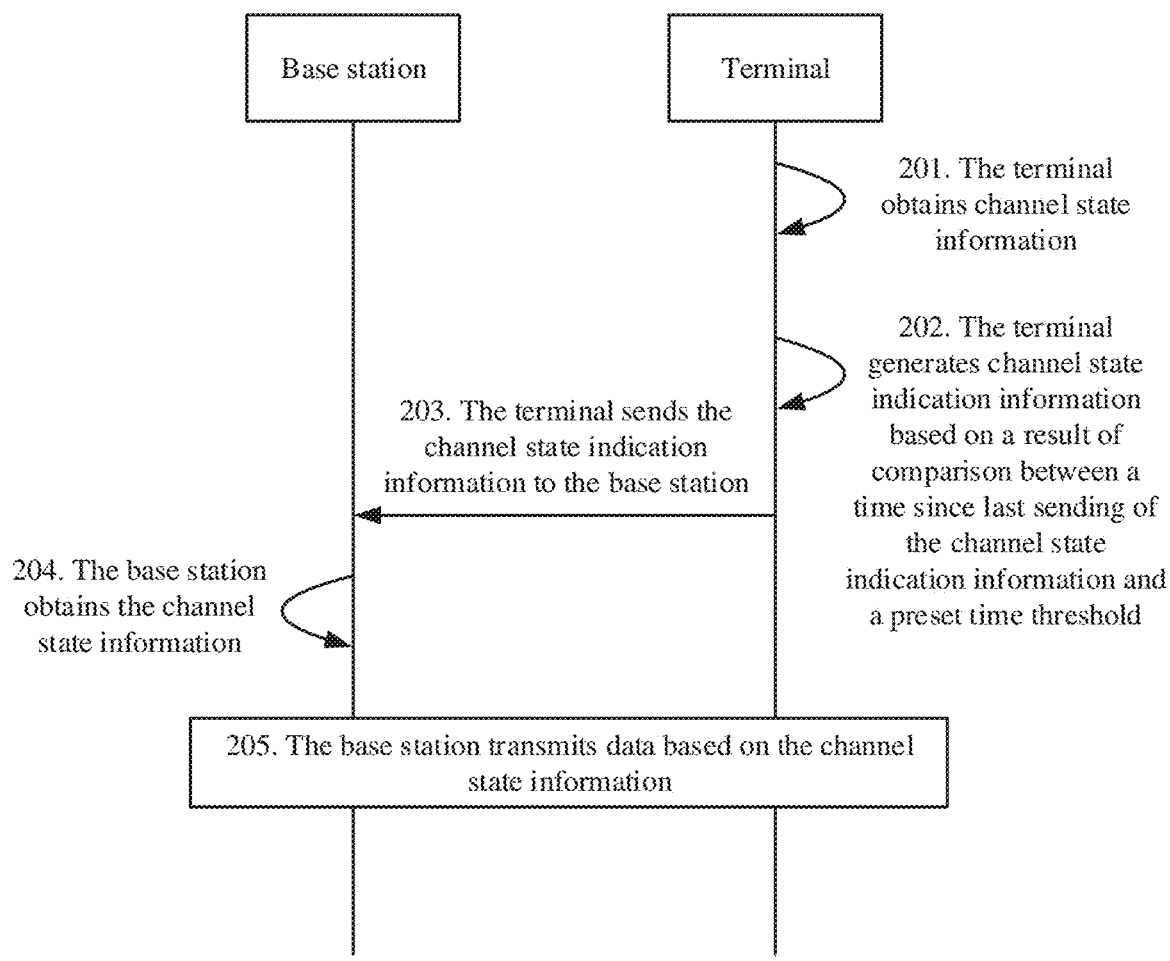
FIG. 3 is a schematic interaction diagram of another channel state indication method according to an embodiment of the present invention.

FIG. 3 is a schematic interaction diagram of another channel state indication method according to an embodiment of the present invention. Specifically, in this embodiment of the present invention, an example in which a first network device is a terminal and a second network device is a base station is used for description. As shown in FIG. 3, the channel state indication method in this embodiment of the present invention may include the following steps.

201. The terminal obtains channel state information.

Optionally, the channel state information may include at least one of types of information such as CQI information, MCS information, power information, and BLER information.

202. The terminal generates channel state indication information based on a result of comparison between a time from last sending of the channel state indication information and a preset time threshold.

The channel state indication information may include an absolute value of the channel state information or an offset value of the channel state information relative to reference channel state information.

Optionally, if a time from last sending of the channel state indication information exceeds (is greater than) the preset time threshold, the channel state indication information may include the absolute value of the channel state information; or if a time from last sending of the channel state indication information does not exceed (is less than or equal to) the preset time threshold, the channel state indication information may include the offset value of the channel state information relative to the reference channel state information. The time compared with the preset time threshold may be a time difference (time interval) between a current time (moment) and a time (moment) at which the channel state indication information is sent last time, or a time difference between a current time at which the channel state indication information is sent and a time at which the channel state indication information is sent last time, or a time difference between a current time at which the channel state information is obtained and a time at which the channel state indication information is sent last time, or the like. This is not limited in this embodiment of the present invention. In other words, when determining whether the terminal feeds back the absolute value of the channel state information or the offset value of the channel state information relative to the reference channel state information to the base station, the terminal may determine whether the terminal has sent the channel state indication information to the base station within a time range corresponding to the preset time threshold, and to be specific, the terminal may determine whether the terminal has reported a CQI, an MCS, power, or a BLER, to determine whether the terminal needs to feed back the absolute value or the offset value. If the terminal has not reported the CQI, the MCS, the power, or the BLER, the terminal may determine to report the absolute value of the channel state information, and to be specific, the terminal may generate the channel state indication information including the absolute value of the channel state information, to improve reliability of the fed back channel state information, thereby improving reliability of data transmission, and helping resolve a problem that indicates that the offset value cannot be used for indication when a current channel state greatly deviates from channel state information reported last time and that is in a scenario in which a channel sharply changes, a reporting period is relatively long, or there is no periodic reporting. Otherwise, if the terminal has already reported the CQI, the MCS, the power, or the BLER, the terminal may generate the channel state indication information including the offset value of the channel state information relative to the reference channel state information, to reduce signaling overheads.

The reference channel state information may be channel state information sent by the terminal last time; the reference channel state information may be preconfigured; or the reference channel state information may be notified by the base station to the terminal. For example, the reference channel state information may be dynamically or semi-statically notified to the terminal by using signaling. For details, refer to related descriptions in the embodiment shown in FIG. 2. Details are not described herein again.

Further, optionally, a length of the preset time threshold may be notified by the base station to the terminal. For example, the length of the preset time threshold may be dynamically or semi-statically notified to the terminal by using signaling; or the length of the preset time threshold may be preconfigured. For example, the length of the preset time threshold may be agreed by using a protocol. This is not limited in this embodiment of the present invention. For example, if it is assumed that a current time is a slot n, a time window corresponding to the preset time threshold may be a time range that starts from a slot n−1 and that ends before the slot n whose length is the length of the preset time threshold.

203. The terminal sends the channel state indication information to the base station.

204. The base station obtains the channel state information.

Specifically, after generating the channel state indication information, in other words, after determining the absolute value or the offset value of the channel state information that needs to be fed back, the terminal may send the channel state indication information to the base station, to notify the base station of the current channel state of the channel between the base station and the terminal. The base station receives the channel state indication information that is sent by the terminal and that is used to indicate the channel state information, and may obtain the channel state information from the channel state indication information. The base station obtains the absolute value of the channel state information or the offset value of the channel state information relative to the reference channel state information.

205. The base station transmits data based on the channel state information.

Optionally, the technical solution in this embodiment of the present invention may be applied to a retransmission technology. When the terminal determines that a NACK or DTX needs to be fed back, step 201 to step 205 may be performed.

Further, optionally, a type of channel state information fed back by the terminal may be predefined, for example, that the CQI is to be fed back is agreed in a protocol; or the type may be notified by the base station to the terminal by using signaling. Specifically, for a manner in which the terminal obtains the absolute value or the offset value, refer to related descriptions in the embodiment shown in FIG. 2. Details are not described herein again.

Optionally, types of the channel state indication information sent last time and the channel state indication information sent this time may be the same or different. For example, if the channel state indication information reported by the terminal last time is a CQI, when a current time since the last reporting does not exceed the preset time threshold, the terminal may report an offset of a CQI corresponding to a current channel relative to a reference CQI. In other words, the terminal may generate the channel state indication information including the offset value and send the channel state indication information to the base station. Otherwise, if the current time since the last reporting exceeds the preset time threshold, the terminal may report the CQI corresponding to the current channel. To be specific, the terminal may report the absolute value of the CQI. For another example, if the channel state indication information reported last time is a CQI, and a current time since the last reporting does not exceed the preset time threshold, the terminal may further report an offset of an MCS corresponding to the current channel relative to a reference MCS. If the current time since the last reporting exceeds the preset time threshold, the terminal may report an absolute value of the MCS corresponding to the current channel. For another example, if the channel state indication information reported last time is a CQI, and a current time since the last reporting does not exceed the preset time threshold, the terminal may further report an offset of a BLER corresponding to the current channel relative to a reference BLER. If the current time since the last reporting exceeds the preset time threshold, the terminal may report an absolute value of the BLER corresponding to the current channel. For another example, if the channel state indication information reported last time is an MCS, and a current time since the last reporting does not exceed the preset time threshold, the terminal may further report an offset of an MCS corresponding to the current channel relative to a reference MCS. If the current time since the last reporting exceeds the preset time threshold, the terminal may report an absolute value of the MCS corresponding to the current channel. For another example, if the channel state indication information reported last time is a BLER, and a current time since the last reporting does not exceed the preset time threshold, the terminal may further report an offset of a BLER corresponding to the current channel relative to a reference BLER. If the current time since the last reporting exceeds the preset time threshold, the terminal may report an absolute value of the BLER corresponding to the current channel, and so on. This is not enumerated herein. Specifically, for descriptions of the reference CQI, the reference MCS, and the reference BLER, refer to related descriptions in the embodiment shown in FIG. 2. Details are not described herein again.

Further, optionally, the base station may store the absolute value of the channel state information in the time window corresponding to the preset time threshold. When the terminal reports the offset value, the base station can determine the absolute value of the current channel state information based on the absolute value and the offset value that is reported by the terminal. Further, the base station can transmit data based on the channel state information. Specifically, a manner in which the base station determines whether the channel state information indicated by the channel state indication information is an absolute value or an offset value may be corresponding to a manner in which the terminal determines whether the absolute value or the offset value is to be reported, and may be specifically obtained through preconfiguration, or may be notified by the terminal to the base station. Further, for a process in which the base station transmits data based on the channel state information reported by the terminal, refer to related descriptions in the embodiment shown in FIG. 2. Details are not described herein again.

In this embodiment of the present invention, the terminal may obtain the channel state information, generate, based on the result of comparison between a time from last sending of the channel state indication information and the preset time threshold, the channel state indication information including the absolute value of the channel state information or the offset value of the channel state information relative to the reference channel state information, and send the channel state indication information to the base station, so that the base station can transmit data based on the channel state information that meets the current channel state, to help improve reliability of data transmission. In addition, in this embodiment of the present invention, the offset value or the absolute value can be adaptively selected for reporting based on an actual scenario, and compared with a manner of reporting only the absolute value, signaling overheads are reduced. Compared with a manner of reporting only an offset value, reliability of an obtained channel state is improved, and reliability of data transmission is further improved. To be specific, signaling overheads can be reduced while it is ensured that a channel state is correctly fed back.

Figure 4:
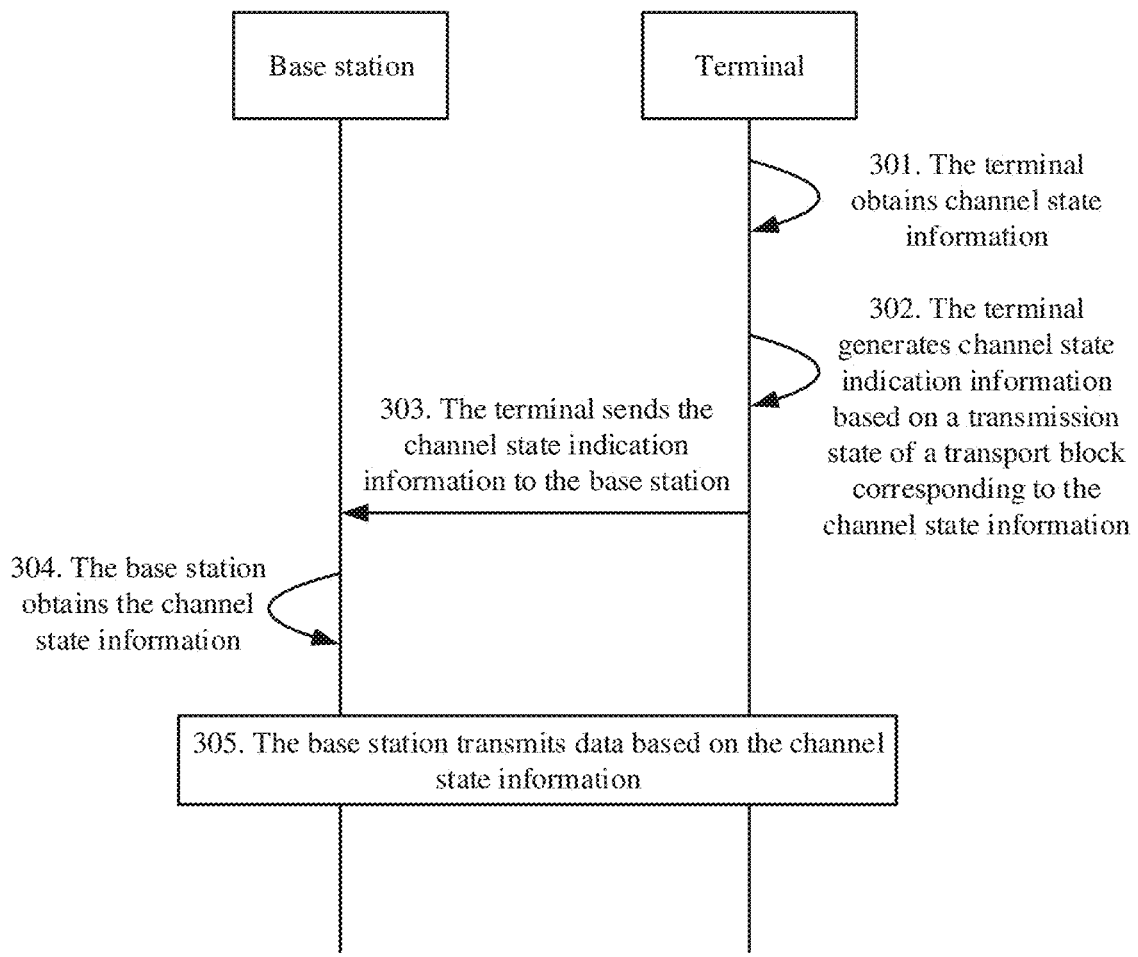
FIG. 4 is a schematic interaction diagram of still another channel state indication method according to an embodiment of the present invention.

FIG. 4 is a schematic interaction diagram of still another channel state indication method according to an embodiment of the present invention. Specifically, in this embodiment of the present invention, an example in which a first network device is a terminal and a second network device is a base station is used for description. As shown in FIG. 4, the channel state indication method in this embodiment of the present invention may include the following steps.

301. The terminal obtains channel state information.

Optionally, the channel state information may include at least one of types of information such as CQI information, MCS information, power information, and BLER information.

302. The terminal generates channel state indication information based on a transmission state of a transport block corresponding to the channel state information.

303. The terminal sends the channel state indication information to the base station.

The channel state indication information may include an absolute value of the channel state information or an offset value of the channel state information relative to reference channel state information.

The reference channel state information may be channel state information sent by the terminal last time; the reference channel state information may be preconfigured; or the reference channel state information may be notified by the base station to the terminal. For example, the reference channel state information may be dynamically or semi-statically notified to the terminal by using signaling. For details, refer to related descriptions in the embodiment shown in FIG. 2. Details are not described herein again.

304. The base station obtains the channel state information.

305. The base station transmits data based on the channel state information.

Optionally, the technical solution in this embodiment of the present invention may be applied to a retransmission technology, and the retransmission technology includes transmission of a transport block that is performed by a base station for a plurality of times. Further, optionally, when the terminal determines that a NACK or DTX needs to be fed back, step 301 to step 305 may be performed.

Further, optionally, if the channel state information corresponds to initial transmission of the transport block, the channel state indication information may include the absolute value of the channel state information; or if the channel state information corresponds to repeated transmission of the transport block, the channel state indication information may include the offset value of the channel state information relative to the reference channel state information. In other words, if the terminal needs to perform reporting for a plurality of times when transmitting a transport block such as a data block, the terminal may report the absolute value of the channel state information only during first transmission, and during repeated transmission other than the first transmission, the terminal may report the offset value of the channel state information relative to the reference channel state information. For example, if the terminal reports an absolute value of a CQI in a slot t1 during the first transmission, the terminal may report, in a slot t2, an offset value of a CQI relative to the CQI in the slot t1 during second transmission, and the terminal may report, in a slot t3, an offset value of a CQI relative to the CQI in the slot t2 during third transmission. In this way, signaling overheads can be reduced while it is ensured that a channel state is correctly fed back. Optionally, the transmission state of the transport block, for example, initial transmission or repeated transmission may be notified by the base station to the terminal. For example, the base station may include a 1-bit new data indicator (NDI) in DCI to indicate whether the transport block scheduled by using the DCI is newly sent data or data sent last time in which the process is retransmitted, or the transmission state may be determined in another manner. This is not limited in this embodiment of the present invention.

Further, optionally, the channel transmitted for a plurality of times may occupy a same frequency domain resource, for example, a physical resource block (PRB) resource, or may occupy different PRB resources. When a PRB resource of a channel transmitted at a time is different from a PRB resource of a channel transmitted at a previous time, even if the channel state information corresponds to the repeated transmission of the transport block, the terminal may still report the absolute value of the channel state information, to improve reliability of the obtained channel state information.

Further, optionally, the terminal may further report the channel state information in combination with physical layer signaling sent by the base station. For example, if the terminal receives, before transmitting a transport block for the first time, physical layer signaling used to indicate reporting of the channel state information, the terminal may determine, based on the physical layer signaling during first reporting, whether the first reporting is to report the absolute value of the channel state information or the offset value of the channel state information relative to the reference channel state information. For example, when the physical layer signaling is a first state, even for the initial transmission, the terminal may report the offset value of the channel state information relative to the reference channel state information. To be specific, the terminal may generate channel state indication information including the offset value. When the physical layer signaling is a second state, the terminal may report the absolute value of the channel state information, that is, generate channel state indication information including the absolute value. For a manner in which the channel state indication information is generated based on the physical layer signaling, refer to related descriptions in the embodiment shown in FIG. 2. Details are not described herein again. Further, in subsequent repeated transmission, the terminal may still report the offset value.

Further, optionally, the terminal may further report the channel state information in combination with information indicating whether a time from last sending of the channel state indication information exceeds a preset time threshold. In other words, the terminal may determine the channel state indication information. For example, when the obtained channel state information is corresponding to the initial transmission of the transport block, the terminal may further determine whether a time from last sending of the channel state indication information exceeds the preset time threshold, and if the time does not exceed the preset time threshold, even for the initial transmission, the terminal may still report the offset value of the channel state information relative to the reference channel state information. To be specific, the terminal may generate the channel state indication information including the offset value. If the time exceeds the preset time threshold, the terminal may report the absolute value of the channel state information. In other words, the terminal may generate the channel state indication information including the absolute value. For a manner in which the channel state indication information is generated based on a result of comparison between a time from last sending of the channel state indication information and the preset time threshold, refer to related descriptions in the embodiment shown in FIG. 3. Details are not described herein again. Further, in subsequent repeated transmission, the terminal may still report the offset value.

Further, optionally, if the channel state indication information includes the offset value of the channel state information relative to the reference channel state information, the channel state indication information and an acknowledgment message may be jointly coded. In other words, the terminal may send a feedback message that includes the channel state indication information and the currently transmitted acknowledgment message. Optionally, when the acknowledgement message is a positive acknowledgement message, the terminal may no longer send the channel state indication information.

Further, optionally, a type of channel state information fed back by the terminal may be predefined, for example, that the CQI is fed back is agreed in a protocol; or the type may be notified by the base station to the terminal by using signaling. Specifically, for a manner in which the terminal obtains the absolute value or the offset value, refer to related descriptions in the embodiment shown in FIG. 2. Details are not described herein again.

Further, optionally, after obtaining the channel state indication information reported by the terminal, the base station may obtain a channel state indicated by the channel state indication information, and transmit data based on the channel state information. Specifically, a manner in which the base station determines whether the channel state information indicated by the channel state indication information is an absolute value or an offset value may be corresponding to a manner in which the terminal determines whether the absolute value or the offset value is to be reported, and may be specifically obtained through preconfiguration, or may be notified by the terminal to the base station. Further, for a process in which the base station transmits data based on the channel state information reported by the terminal, refer to related descriptions in the embodiment shown in FIG. 2. Details are not described herein again.

In this embodiment of the present invention, the terminal may obtain the channel state information, generate, based on whether the transmission state of the transport block corresponding to the channel state information is the initial transmission or the repeated transmission, the channel state indication information including the absolute value of the channel state information or the offset value of the channel state information relative to the reference channel state information, and send the channel state indication information to the base station, so that the base station can transmit data based on the channel state information that meets the current channel state, to help improve reliability of data transmission. In addition, in this embodiment of the present invention, the offset value or the absolute value can be adaptively selected for reporting based on an actual scenario, and compared with a manner of reporting only an absolute value, signaling overheads are reduced. Compared with a manner of reporting only an offset value, reliability of an obtained channel state is improved, and reliability of data transmission is further improved. To be specific, signaling overheads can be reduced while it is ensured that a channel state is correctly fed back.

Figure 5:
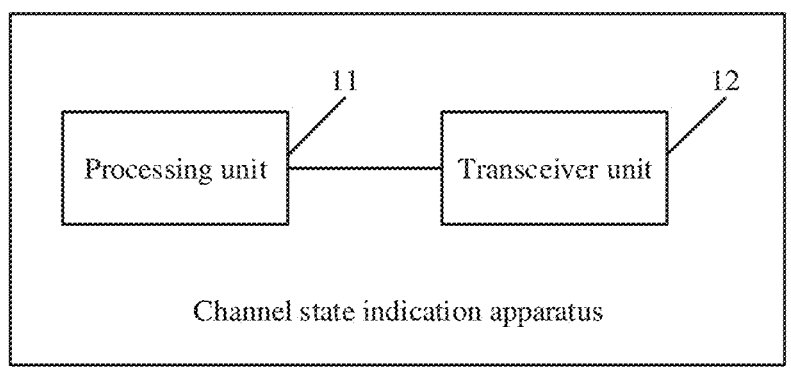
FIG. 5 is a schematic structural diagram of a channel state indication apparatus according to an embodiment of the present invention.

FIG. 5 is a schematic structural diagram of a channel state indication apparatus according to an embodiment of the present invention. Specifically, the apparatus in this embodiment of the present invention may be specifically disposed in the foregoing first network device. As shown in FIG. 5, the apparatus in this embodiment of the present invention may include a processing unit 11 and a transceiver unit 12.

The processing unit 11 is configured to obtain channel state information.

The processing unit 11 is further configured to generate channel state indication information, where the channel state indication information includes an absolute value of the channel state information or an offset value of the channel state information relative to reference channel state information.

The transceiver unit 12 is configured to send the channel state indication information to a second network device.

Optionally, the transceiver unit 12 is further configured to receive physical layer signaling sent by the second network device. The physical layer signaling includes a first state and a second state.

Further optionally, if the physical layer signaling is the first state, the channel state indication information may include the offset value of the channel state information relative to the reference channel state information; and/or if the physical layer signaling is the second state, the channel state indication information may include the absolute value of the channel state information.

Optionally, if a time from last sending of the channel state indication information exceeds a preset time threshold, the channel state indication information may include the absolute value of the channel state information; or if a time from last sending of the channel state indication information does not exceed the preset time threshold, the channel state indication information may include the offset value of the channel state information relative to the reference channel state information.

Optionally, a length of the preset time threshold may be notified by the second network device to the first network device, or the length of the preset time threshold may be preconfigured.

Optionally, if the channel state information corresponds to initial transmission of a transport block, the channel state indication information may include the absolute value of the channel state information; or if the channel state information corresponds to repeated transmission of the transport block, the channel state indication information may include the offset value of the channel state information relative to the reference channel state information.

Optionally, the reference channel state information may be channel state information sent by the first network device last time; the reference channel state information may be preconfigured; or the reference channel state information may be notified by the second network device to the first network device.

Optionally, the channel state information may include at least one of CQI information, MCS information, BLER information, and power information.

Optionally, the apparatus may implement, by using the foregoing units, some or all of steps performed by the terminal in the channel state indication method in the embodiments corresponding to FIG. 2 to FIG. 4. It should be understood that this embodiment of the present invention is an apparatus embodiment corresponding to the method embodiments, and the description of the method embodiments is also applicable to this embodiment of the present invention.

Figure 6:
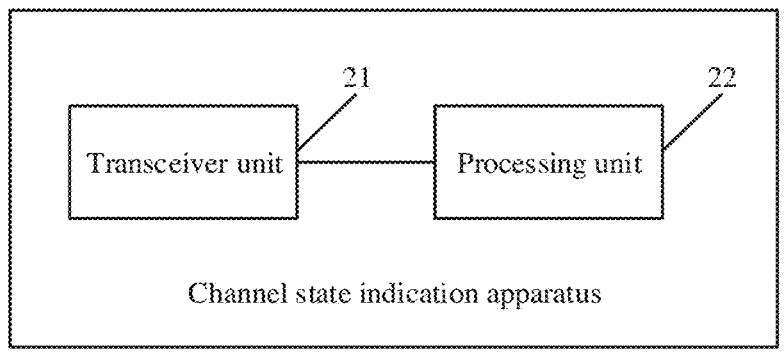
FIG. 6 is a schematic structural diagram of another channel state indication apparatus according to an embodiment of the present invention.

FIG. 6 is a schematic structural diagram of another channel state indication apparatus according to an embodiment of the present invention. Specifically, the apparatus in this embodiment of the present invention may be specifically disposed in the foregoing second network device. As shown in FIG. 6, the apparatus in this embodiment of the present invention may include a transceiver unit 21 and a processing unit 22.

The transceiver unit 21 is configured to receive channel state indication information that is sent by the first network device and that is used to indicate channel state information, where the channel state indication information includes an absolute value of the channel state information or an offset value of the channel state information relative to reference channel state information.

The processing unit 22 is configured to obtain the channel state information.

Optionally, the transceiver unit 21 is further configured to send physical layer signaling to the first network device. The physical layer signaling may include a first state and a second state.

Further optionally, if the physical layer signaling is the first state, the channel state indication information may include the offset value of the channel state information relative to the reference channel state information; and/or if the physical layer signaling is the second state, the channel state indication information may include the absolute value of the channel state information.

Optionally, if a time from last sending of the channel state indication information exceeds a preset time threshold, the channel state indication information may include the absolute value of the channel state information; or if a time from last sending of the channel state indication information does not exceed the preset time threshold, the channel state indication information may include the offset value of the channel state information relative to the reference channel state information.

Optionally, a length of the preset time threshold may be notified by the second network device to the first network device, or the length of the preset time threshold may be preconfigured.

Optionally, if the channel state information corresponds to initial transmission of a transport block, the channel state indication information may include the absolute value of the channel state information; or if the channel state information corresponds to repeated transmission of the transport block, the channel state indication information may include the offset value of the channel state information relative to the reference channel state information.

Optionally, the reference channel state information may be channel state information sent by the first network device last time; the reference channel state information may be preconfigured; or the reference channel state information may be notified by the second network device to the first network device.

Optionally, the channel state information may include at least one of CQI information, MCS information, BLER information, and power information.

Optionally, the apparatus may implement, by using the foregoing units, some or all of steps performed by the base station in the channel state indication method in the embodiments corresponding to FIG. 2 to FIG. 4. It should be understood that this embodiment of the present invention is an apparatus embodiment corresponding to the method embodiments, and the description of the method embodiments is also applicable to this embodiment of the present invention.

In this embodiment of the present invention, the first network device may obtain the channel state information, generate, according to a preset rule, the channel state indication information including the absolute value of the channel state information or the offset value of the channel state information relative to the reference channel state information, and send the channel state indication information to the second network device to indicate a current channel state of a channel, so that the second network device can transmit data based on the channel state information that meets the current channel state, to help improve reliability of data transmission.

Figure 7:
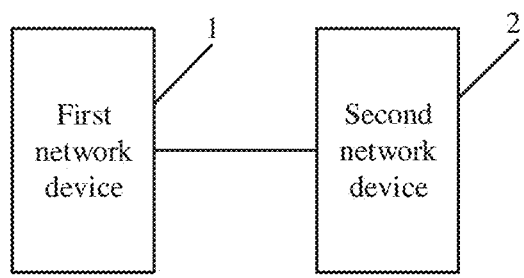
FIG. 7 is a schematic structural diagram of a channel state indication system according to an embodiment of the present invention.

FIG. 7 is a schematic structural diagram of a channel state indication system according to an embodiment of the present invention. Specifically, as shown in FIG. 7, the message responding system in this embodiment of the present invention includes a first network device 1 and a second network device 2.

The first network device 1 is configured to: obtain channel state information; generate channel state indication information; send the channel state indication information to the second network device 2, where the channel state indication information includes an absolute value of the channel state information or an offset value of the channel state information relative to reference channel state information.

The second network device 2 is configured to: receive the channel state indication information that is sent by the first network device 1 and that is used to indicate the channel state information; and obtain the channel state information.

Optionally, the first network device or the second network device may be a base station, or may be a terminal. For example, for the first network device, refer to related descriptions of the terminal in the embodiments shown in FIG. 1 to FIG. 4. For the second network device, refer to related descriptions of the base station in the embodiments shown in FIG. 1 to FIG. 4. Details are not described herein again.

Figure 8:
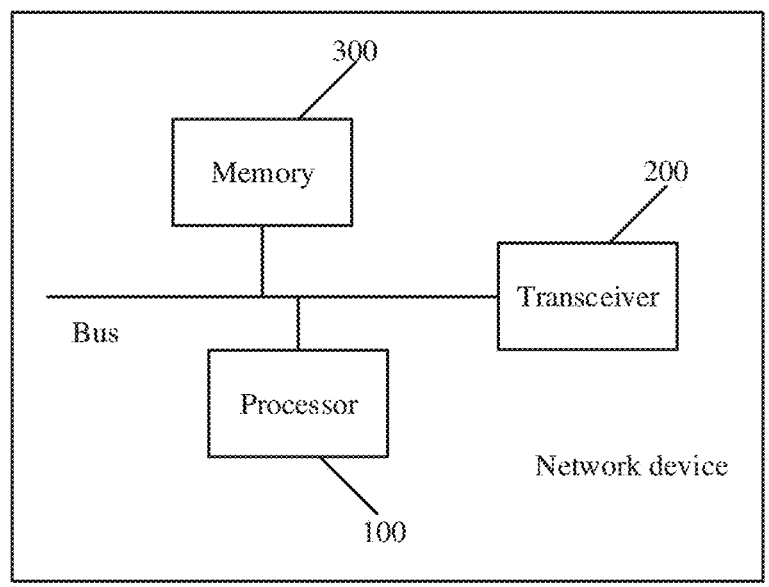
FIG. 8 is a schematic structural diagram of a network device according to an embodiment of the present invention.

FIG. 8 is a schematic structural diagram of a network device according to an embodiment of the present invention. Specifically, as shown in FIG. 8, the user equipment in this embodiment of the present invention may include: a transceiver 200 and a processor 100. The processor 100 is connected to the transceiver 200. Optionally, the user equipment may further include a memory 300, and the memory 300 may be connected to the processor 100.

The transceiver 200, the memory 300, and the processor 100 may implement a data connection by using a bus, or may implement data connection in another manner. A connection implemented by using the bus is described in this embodiment.

The processor 100 may be a central processing unit (English: Central Processing Unit, CPU for short), a network processor (English: Network Processor, NP for short), or a combination of a CPU and an NP.

The processor 100 may further include a hardware chip. The hardware chip may be an application-specific integrated circuit (ASIC) a programmable logic device (PLD), or a combination thereof. The PLD may be a complex programmable logic device (CPLD), a field-programmable gate array (FPGA), generic array logic (GAL), or any combination thereof.

The memory 300 may include a volatile memory, for example, a random access memory (RAM). The memory may also include a non-volatile memory, for example, a flash memory, a hard disk (HDD), or a solid-state drive (SSD). The memory 300 may further include a combination of the foregoing types of memories.

The network device may be a terminal, or may be a base station. Optionally, the memory 300 may be configured to store a program instruction. The processor 100 may invoke the program instruction stored in the memory 300, and may perform one or more steps in the embodiments shown in FIG. 2 to FIG. 4, or an optional implementation thereof, so that the network device implements the functions in the foregoing method. For example, the network device may implement, by using the foregoing components, some or all of steps performed by the first network device, for example, the terminal, in the channel state indication method in the embodiments corresponding to FIG. 2 to FIG. 4. Optionally, the transceiver may correspond to the transceiver unit in the embodiment shown in FIG. 5, and the processor may correspond to the processing unit in the embodiment shown in FIG. 5.

Specifically, the processor 100 may be configured to: obtain channel state information; generate channel state indication information, where the channel state indication information includes an absolute value of the channel state information or an offset value of the channel state information relative to reference channel state information; and invoke the transceiver 200 to send the channel state indication information to another network device.

Optionally, the processor 100 may be further configured to: invoke the transceiver 200 to receive physical layer signaling sent by the another network device, where the physical layer signaling includes a first state and a second state.

Optionally, if the physical layer signaling is the first state, the channel state indication information may include the offset value of the channel state information relative to the reference channel state information; and/or if the physical layer signaling is the second state, the channel state indication information may include the absolute value of the channel state information.

Optionally, if a time from last sending of the channel state indication information exceeds a preset time threshold, the channel state indication information may include the absolute value of the channel state information; or if a time from last sending of the channel state indication information does not exceed the preset time threshold, the channel state indication information may include the offset value of the channel state information relative to the reference channel state information.

Optionally, a length of the preset time threshold may be notified by the second network device to the first network device, or the length of the preset time threshold may be preconfigured.

Optionally, if the channel state information corresponds to initial transmission of a transport block, the channel state indication information may include the absolute value of the channel state information; or if the channel state information corresponds to repeated transmission of the transport block, the channel state indication information may include the offset value of the channel state information relative to the reference channel state information.

Optionally, the reference channel state information may be channel state information sent by the first network device last time; the reference channel state information may be preconfigured; or the reference channel state information may be notified by the second network device to the first network device.

Optionally, the channel state information may include at least one of CQI information, MCS information, BLER information, and power information.

Figure 9:
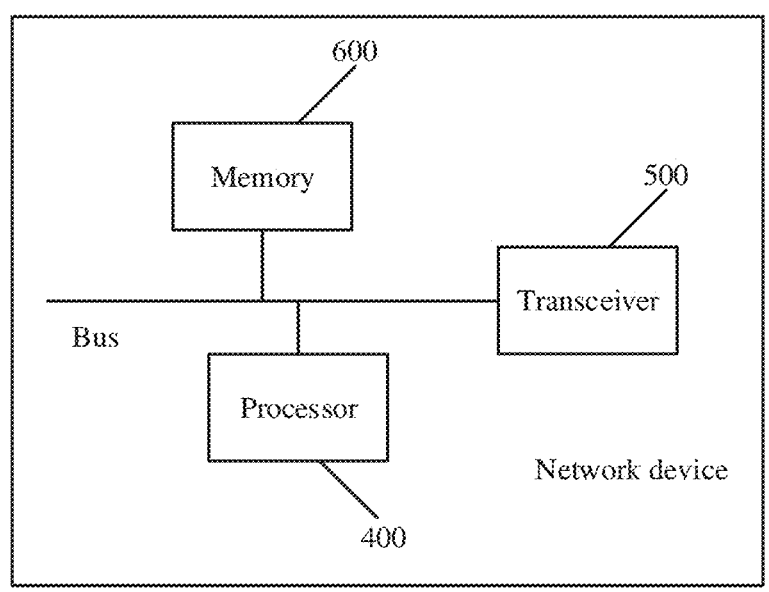
FIG. 9 is a schematic structural diagram of another network device according to an embodiment of the present invention.

FIG. 9 is a schematic structural diagram of another network device according to an embodiment of the present invention. Specifically, as shown in FIG. 9, the network device in this embodiment of the present invention may include: a transceiver 500 and a processor 400. The processor 400 is connected to the transceiver 500. Optionally, the network device may further include a memory 600, and the memory 600 may be connected to the processor 400.

The transceiver 500, the memory 600, and the processor 400 may perform data connection by using a bus, or may perform data connection in another manner. A connection implemented by using the bus is described in this embodiment.

The processor 400 may be a CPU, an NP, or a combination of a CPU and an NP.

The processor 400 may further include a hardware chip. The hardware chip may be an ASIC, a PLD, or a combination thereof. The PLD may be a CPLD, an FPGA, a GAL, or any combination thereof.

The memory 600 may include a volatile memory, for example, a RAM. The memory may also include a non-volatile memory, for example, a flash memory, an HDD, or an SSD. The memory 600 may further include a combination of the foregoing types of memories.

The network device may be a base station, or may be a terminal. Optionally, the memory 600 may be configured to store a program instruction. The processor 400 may invoke the program instruction stored in the memory 600, and may perform one or more steps in the embodiments shown in FIG. 2 to FIG. 4, or an optional implementation thereof, so that the network device implements the functions in the foregoing method. For example, the network device may implement, by using the foregoing components, some or all of steps performed by the second network device, for example, the base station, in the channel state indication method in the embodiments corresponding to FIG. 2 to FIG. 4. Optionally, the transceiver may correspond to the transceiver unit in the embodiment shown in FIG. 6, and the processor may correspond to the processing unit in the embodiment shown in FIG. 6.

Specifically, the processor 400 may be configured to: invoke the transceiver 500 to receive channel state indication information that is sent by another network device and that is used to indicate channel state information, where the channel state indication information includes an absolute value of the channel state information or an offset value of the channel state information relative to reference channel state information; obtain the channel state information; and invoke the transceiver 500 to send physical layer signaling to the another network device, where the physical layer signaling includes a first state and a second state.

Optionally, if the physical layer signaling is the first state, the channel state indication information may include the offset value of the channel state information relative to the reference channel state information; and/or if the physical layer signaling is the second state, the channel state indication information may include the absolute value of the channel state information.

Optionally, if a time from last sending of the channel state indication information exceeds a preset time threshold, the channel state indication information may include the absolute value of the channel state information; or if a time from last sending of the channel state indication information does not exceed the preset time threshold, the channel state indication information may include the offset value of the channel state information relative to the reference channel state information.

Optionally, a length of the preset time threshold may be notified by the second network device to the first network device, or the length of the preset time threshold may be preconfigured.

Optionally, if the channel state information corresponds to initial transmission of a transport block, the channel state indication information may include the absolute value of the channel state information; or if the channel state information corresponds to repeated transmission of the transport block, the channel state indication information may include the offset value of the channel state information relative to the reference channel state information.

Optionally, the reference channel state information may be channel state information sent by the first network device last time; the reference channel state information may be preconfigured; or the reference channel state information may be notified by the second network device to the first network device.

Optionally, the channel state information may include at least one of CQI information, MCS information, BLER information, and power information.

In this embodiment of the present invention, the first network device may obtain the channel state information, generate, according to a preset rule, the channel state indication information including the absolute value of the channel state information or the offset value of the channel state information relative to the reference channel state information, and send the channel state indication information to the second network device to indicate a current channel state of a channel, so that the second network device can transmit data based on the channel state information that meets the current channel state, to help improve reliability of data transmission.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of the present are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A method, comprising:
   receiving, by a first network device, physical layer signaling sent by a second network device, wherein the physical layer signaling indicates a first state or a second state, and wherein the physical layer signaling includes feedback time information;
   obtaining, by the first network device, channel state information;
   generating, by the first network device, channel state indication information by:
      in response to the physical layer signaling indicating the first state, generating the channel state indication information comprising an absolute value of the channel state information; and
      in response to the physical layer signaling indicating the second state, generating the channel state indication information comprising an offset value of the channel state information relative to reference channel state information, wherein the reference channel state information is notified by the second network device to the first network device;
   determining, by the first network device, a transmission time based on the feedback time information; and
   sending, by the first network device, the channel state indication information to the second network device at the transmission time.

2. The method according to claim 1, wherein the channel state information comprises:
   channel quality indicator (CQI) information.

3. The method according to claim 1, wherein the channel state information comprises:
   modulation and coding scheme (MCS) information.

4. The method according to claim 1, wherein the channel state information comprises:
   block error rate (BLER) information.

5. The method according to claim 1, wherein the channel state information comprises:
   power information.

6. A method, comprising:
   sending, by a second network device, physical layer signaling to a first network device, wherein the physical layer signaling includes feedback time information indicating a transmission time;
   receiving, by the second network device, channel state indication information that is sent by the first network device at the transmission time, wherein the channel state indication information indicates channel state information, and wherein:
      when a time between a previous moment in which previous channel state indication information is sent and the transmission time exceeds a preset time threshold, the channel state indication information comprises an absolute value of the channel state information; and
      when the time between the previous moment in which the previous channel state indication information is sent and the transmission time does not exceed the preset time threshold, the channel state indication information comprises an offset value of the channel state information relative to reference channel state information, wherein the reference channel state information is notified by the second network device to the first network device; and obtaining, by the second network device, the channel state information.

7. The method according to claim 6, wherein a length of the preset time threshold is notified by the second network device to the first network device.

8. The method according to claim 6, wherein the channel state information comprises:
   channel quality indicator (CQI) information;
   modulation and coding scheme (MCS) information;
   block error rate (BLER) information; or
   power information.

9. The method according to claim 6, wherein a length of the preset time threshold is preconfigured.

10. An apparatus, comprising:
    a transceiver;
    at least one processor;
    a non-transitory computer-readable storage medium storing a program to be executed by the at least one processor, the program including instructions for:
    receiving physical layer signaling sent by a second network device, wherein the physical layer signaling indicates a first state or a second state, and wherein the physical layer signaling includes feedback time information;
    obtaining channel state information; and
    generating channel state indication information by:
       in response to the physical layer signaling indicating the first state, generating the channel state indication information comprising an absolute value of the channel state information; and
       in response to the physical layer signaling indicating the first state, generating the channel state indication information comprising an offset value of the channel state information relative to reference channel state information, wherein the reference channel state information is notified by the second network device to the apparatus;
    determine a transmission time based on the feedback time information; and
    send, using the transceiver, the channel state indication information at the transmission time.

11. The apparatus according to claim 10, wherein the channel state information comprises:
    modulation and coding scheme (MCS) information.

12. The apparatus according to claim 10, wherein the channel state information comprises:
    block error rate (BLER) information.

13. The apparatus according to claim 10, wherein the channel state information comprises:
    power information.

* * * * *